United States Patent [19]

Pottorff

[11] Patent Number: 4,943,226
[45] Date of Patent: Jul. 24, 1990

[54] COVER FOR COLLAPSING BOARD

[76] Inventor: Earl T. Pottorff, 2436 Taylor Rd., Savannah, N.Y. 13146

[21] Appl. No.: 245,635

[22] Filed: Sep. 19, 1988

[51] Int. Cl.⁵ .............................................. B29C 47/20
[52] U.S. Cl. ................................. 425/326.1; 425/327; 428/99; 428/122
[58] Field of Search .................... 428/83, 99, 100, 122; 425/327, 326.1, 325

[56] References Cited

U.S. PATENT DOCUMENTS

| | | | |
|---|---|---|---|
| 2,058,793 | 10/1936 | Hoffman | 428/83 X |
| 2,856,230 | 10/1958 | Adell | 428/122 |
| 3,752,612 | 8/1973 | Duuren | 425/327 |
| 4,316,348 | 2/1982 | Adell | 428/122 X |

Primary Examiner—Alexander S. Thomas
Attorney, Agent, or Firm—Wall and Roehrig

[57] ABSTRACT

A cover is provided for hardwood collapsing boards of the type employed in the manufacture of polyethylene film. The collapsing board covers are extruded in the form of channels from a flexible, but rigid or semi-rigid plastic synthetic resin material impregnated with graphite or another lubricating agent. The channel has a convex arcuate web to fit the front face of the collapsing board, and upper and lower flanges that overfit edges of the collapsing board. Lip members on the free edges of the upper and lower flanges snap fit behind the board to retain the cover on it. These covers absorb the wear and abrasion from the polyethylene film passing over the collapsing boards.

6 Claims, 1 Drawing Sheet

COVER FOR COLLAPSING BOARD

BACKGROUND OF THE INVENTION

This invention relates to the manufacture of flexible plastic film, such as polyethylene film, for use as bags, sheets, and the like.

Polyethylene film is typically created using a tube extrusion process, in which a tube of the soft plastic is extruded through an annular die, and is then inflated and expanded until the tube wall is a desired thickness. The film is typically made anywhere in the range of about 0.3 mils to several mils, depending upon the end use. After the tube of material is extruded, it is drawn vertically upward, typically a distance of forty feet or more. The air within the tube expands the tube outward until the plastic sets. On its journey upwards, the extruded tube has to be flattened so that it may pass between rollers. The flattening is accomplished by a collapsing assembly, in which two facing arrangements of collapsing boards urge the tubular extrusion to a flattened state by the time it reaches the rollers.

Typically, this arrangement consists of a pair of facing collapsing frames, each of which has a number of collapsing boards which are horizontal and arranged in parallel, one above the other on the frame. There are typically sixty to ninety boards on a side, the boards being from four to twelve feet in length. These collapsing boards are formed of high quality hardwood, usually a close grained maple, which is extremely expensive. The boards have a curved or arcuate face against which the plastic film passes. The polyethylene film is quite abrasive to the wood. Even very high quality hardwood as typically used will tend to wear out somewhat unevenly. These boards thus have to be replaced periodically and this is an expensive and time consuming procedure. To replace the collapsing boards on the frame, the boards and any associated hardware have to be unscrewed, so that the entire board can be replaced. The boards are typically four to twenty feet in length, and can be quite heavy and unwieldy for a workman to manage. There is considerable down time involved with collapsing board replacement, as it now takes about three full days to replace all the collapsing boards.

OBJECTS AND SUMMARY OF THE INVENTION

Accordingly, it is an object of this invention to provide a technique of covering the collapsing boards so as to avoid the drawbacks of the present system as described hereinabove.

It is a more specific object of this invention to provide a replaceable cover for the collapsing boards which can be installed reliably and quickly on existing hardwood collapsing boards, and which will avoid the need to replace the expensive hardwood collapsing boards.

According to one aspect of this invention, a cover for collapsing boards is provided as an elongated channel extruded from a semi-rigid or rigid, but flexible plastic synthetic resin material. The resin is filled or impregnated with graphite or another suitable lubricating agent. To fit the collapsing boards, the channel has a convex, arcuate web to fit over the front face of the collapsing board, and upper and lower flanges at its edges to fit the edges of the collapsing board. There are lip members provided at the free edges of the upper and lower flanges. These snap fit behind the collapsing board to retain the cover on it. The lip members can be V-shaped or can be inwardly directed flanges with a retaining bead formed at an inward edge thereof. The covers have the same profile as the hardwood boards, and take the frictional wear of the film moving past.

The above and many other objects, features and advantages of this invention will be more fully understood from the ensuing description of a preferred embodiment, which should be considered in connection with the accompanying Drawing.

DETAILED DESCRIPTION OF A PREFERRED EMBODIMENT

Figure 1:
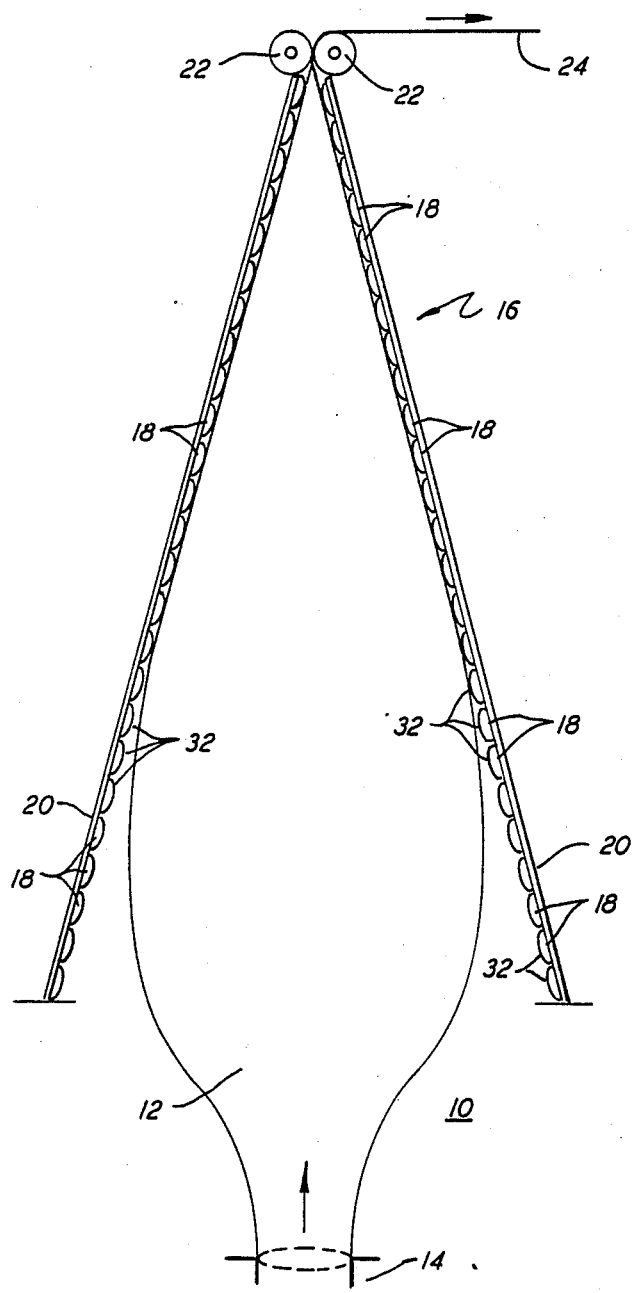
FIG. 1 is a schematic elevational view of a portion of a plastic film extrusion process, illustrating the role of collapsing boards.

With reference to the Drawing, and initially to FIG. 1, a polyethylene film extrusion arrangement 10 involves forming of a tubular extrusion 12 of polyethylene film through an extrusion die 14, shown schematically here as a ring or annular die. Not shown is an air jet for injecting make-up air into the interior of the extrusion, as necessary. The film in the extrusion 12 is initially somewhat fluid, and inflates to a larger diameter, with a correspondingly thinner wall, cooling and solidifying when a predetermined thickness is reached. The process is controlled and adjusted so that the film has a uniform thickness, and this basic process is well known in the art.

As the tubular extrusion 12 is drawn upwards, it must be flattened, and so a collapsing frame 16 is provided to urge opposite sides of the tubular extrusion 12 towards one another. Here the collapsing frame consists of a pair of opposed arrays of horizontal collapsing boards 18. These boards 18, which are shown end-on, are elongated hardwood members with a generally D-shaped cross section. Close-, straight-grained hardwood, such as maple, is required to withstand the abrasiveness of the polyethylene film. This type of hardwood is extremely expensive. As robust as the hardwood is, it will still wear out as the film 12 is drawn past it, and these boards have to be replaced. The boards 18 are arranged in parallel, one above the other, and are supported generally on vertical support members 20. The two opposed arrays lean into one another to collapse the extrusion 12 at the top, where it passes between a pair of rollers 22. There the film exits as a double thickness 24 of film, and proceeds to cutting, printing, rolling, or other equipment (not shown).

Figure 2:
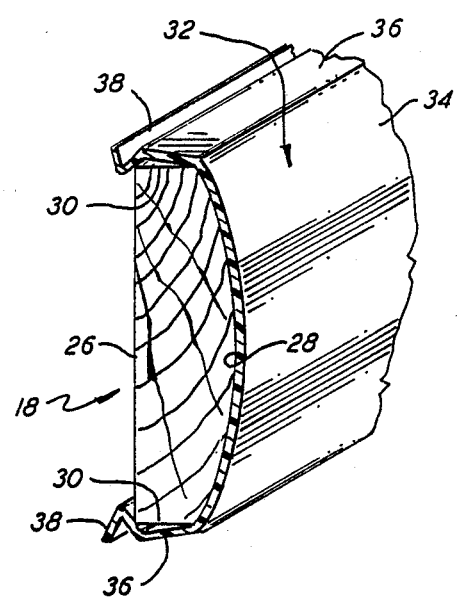
FIG. 2 is a partial perspective view showing a collapsing board cover according to one preferred embodiment.

The configuration of the collapsing board 18 is shown in more detail in FIG. 2. The boards 18 each have a flat back surface 26 which is fastened by screws or other hardware into the support members 20, and a convex, generally cylindrical arcuate front surface 28. The collapsing boards 18 also have generally horizontal top and bottom edges 30.

In order to absorb the frictional rubbing of the tubular extrusion 12, the boards 18 are provided with replaceable collapsing board covers 32, a portion of one being shown here. In a preferred embodiment, the cover 32 is an extruded channel member formed of a graphite impregnated, flexible, rigid synthetic resin. Torlon, which is a graphite-impregnated nylon resin, is suitable for this. This material has a high slip factor, yet is rigid enough to retain its own shape. Another extrudable material, such as polyvinyl chloride, could also be used. The channel has an arcuate face or web 34 which fits the arcuate face 28 of the board 18, and top and bottom flanges 36 which extend from top and bottom edges of the face 34 over the collapsing board edges 30 to the rear surface 26. In this embodiment, there are V-shaped lip members 38 at the rear or free edges of the flanges 36. These snap over the board edges 30 at the rear surface 26 to retain the cover 32 on the board 18.

Figure 3:
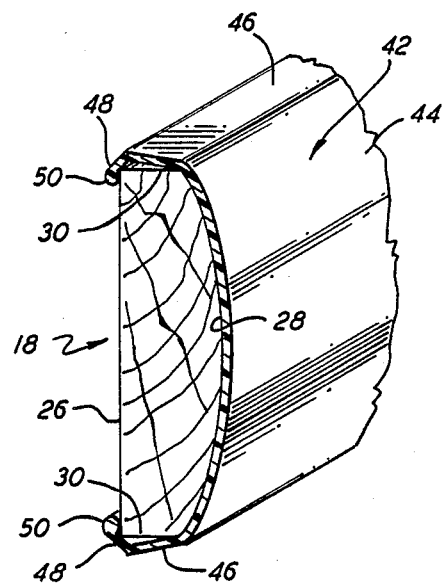
FIG. 3 is a partial perspective view showing a collapsing board cover according to another embodiment.

As shown in FIG. 3, a collapsing board cover 42 according to an alternative embodiment can have a similar arcuate face or web 44 and top and bottom flanges 46. Here, however, the lips 48 are inwardly directed flange members having rounded beads 58 formed along their free edges.

To install the covers 32 or 42, they simply snap into place over the existing boards 18. The top and bottom flanges 36 can be cut out, as necessary, to accommodate the vertical support members 20 and any mounting hardware. Thus, it is unnecessary to remove any of the collapsing boards 18 from the support members 20.

In the event that new equipment is being provided, a less expensive material can be substituted for the hardwood collapsing board 18 with covers 32 or 42 supported on it. That is, steel or a softwood support can be used to carry the covers 32 or 42.

While this invention has been described in detail with reference to certain preferred embodiments, the invention is not limited to those embodiments. Rather, many modifications and variations can be carried out by those skilled in the art without departing from the scope and spirit of this invention, as defined in the appended claims.

What is claimed is:

1. A cover for a collapsing board employed in the manufacture of polyethylene film wherein a plurality of collapsing boards are arranged parallel across a travel direction of said film to contact the latter and urge an extrusion of the film to a flattened condition, each said collapsing board being an elongated member of arcuate profile in cross section with top and bottom edges and a convex arcuate front face therebetween; said cover comprising an elongated channel of an extrudable plastic synthetic resin material, the channel having a convex arcuate web to match the arcuate front face of the collapsing board, upper and lower flanges at edges of said web to match the edges of the collapsing board, and inwardly directed lip members on the free edges of said upper and lower flanges which snap fit behind the board to retain the cover thereon.

2. A collapsing board cover according to claim 1 wherein said lip members are V-shaped in cross-section.

3. A collapsing board cover according to claim 1 wherein said lip members have a retaining bead at an inward edge thereof.

4. A cover for a collapsing board employed in the manufacture of polyethylene film wherein a plurality of collapsing boards are arranged parallel across a travel direction of said film to contact the latter and urge an extrusion of the film to a flattened condition, each said collapsing board being an elongated member of arcuate profile in cross section with top and bottom edges and a convex arcuate front face therebetween; said cover comprising an elongated channel of an extrudable plastic synthetic resin material, the channel having a convex arcuate web to match the arcuate front face of the collapsing board, upper and lower flanges at edges of said web to match the edges of the collapsing board, and lip members on the free edges of said upper and lower flanges which snap fit behind the board to retain the cover thereon, wherein said synthetic resin material is impregnated with a lubricating agent.

5. A collapsing board cover according to claim 4 wherein said lubricating agent is graphite.

6. A collapsing board assembly of the type employed in the manufacture of polyethylene film comprising a frame; first and second arrays of collapsing boards the arrays facing one another and said boards being arrayed in parallel across a travel direction of the film to contact the latter and urge a tubular extrusion of the film to a flattened condition, each said collapsing board including an elongated rigid member of arcuate profile in cross section with top and bottom edges and a convex arcuate front face therebetween; each said collapsing board further comprising a cover in the form of an elongated channel of an extrudable plastic synthetic resin material filled with a lubricant agent, the channel having a convex arcuate web matching the arcuate front face of the associated collapsing board, upper and lower flanges at edges of said web matching the associated edges of the collapsing board, and lip members on free edges of said upper and lower flanges which snap-fit behind the collapsing board to retain the cover thereon.

* * * * *